Aug. 28, 1962
C. R. WOOD
3,051,540
CARRYING CASE AND SEAT
Filed Oct. 5, 1960
3 Sheets-Sheet 1
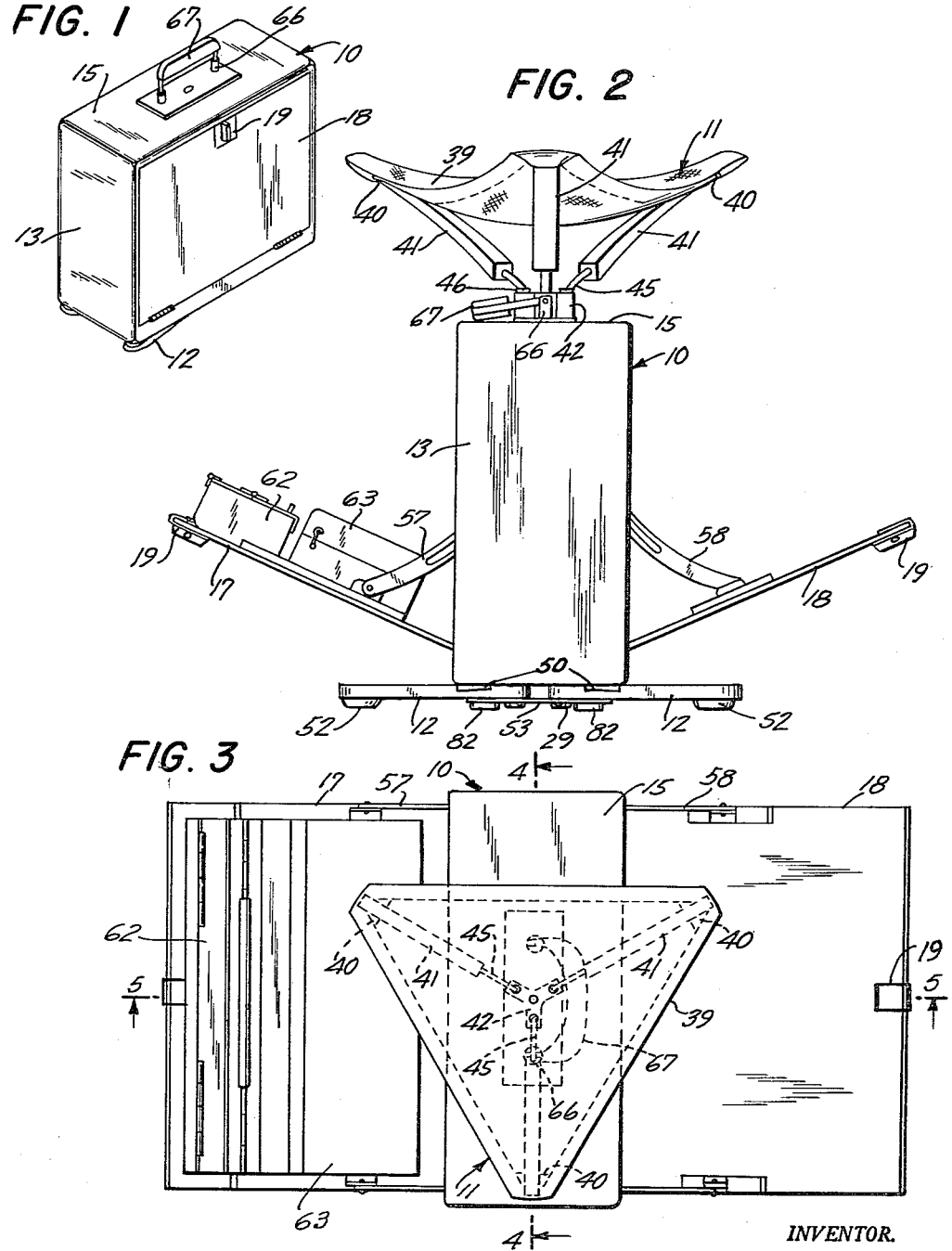
INVENTOR.
CHARLES R. WOOD
BY
Clark & Ott
ATTORNEYS Aug. 28, 1962   C. R. WOOD   3,051,540
CARRYING CASE AND SEAT
Filed Oct. 5, 1960   3 Sheets-Sheet 2

INVENTOR.
CHARLES R. WOOD
BY Clark & Ott
ATTORNEYS

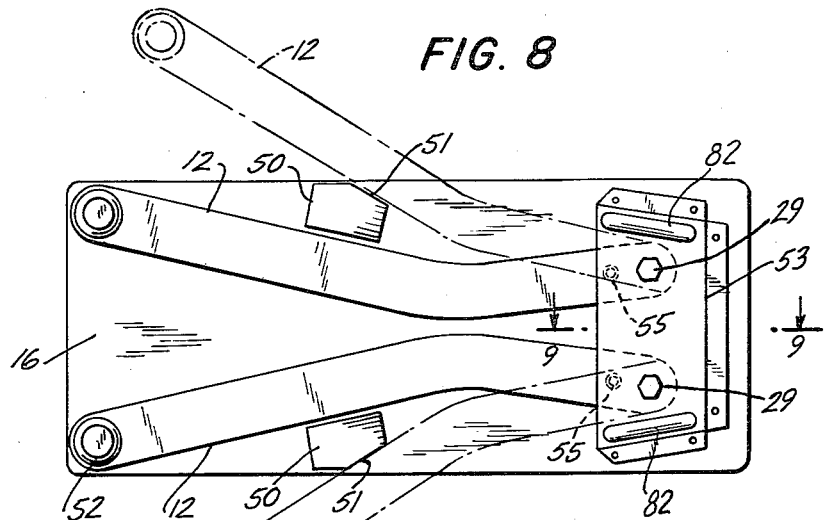
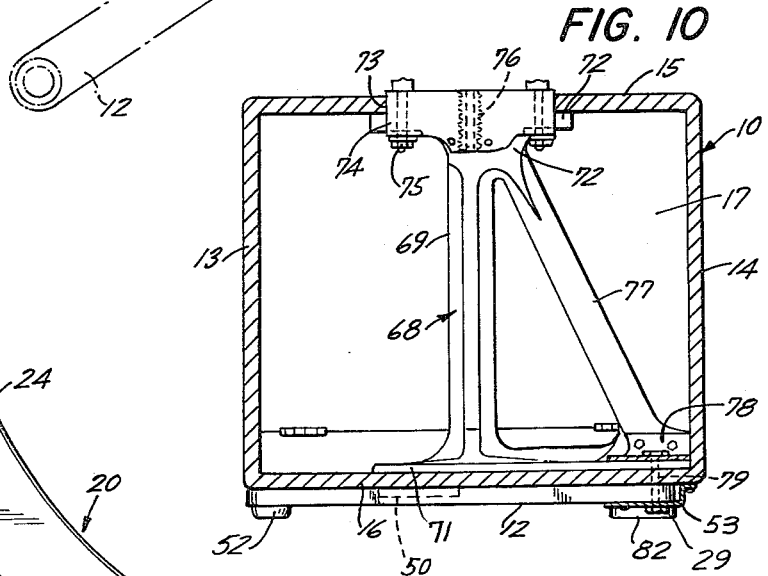
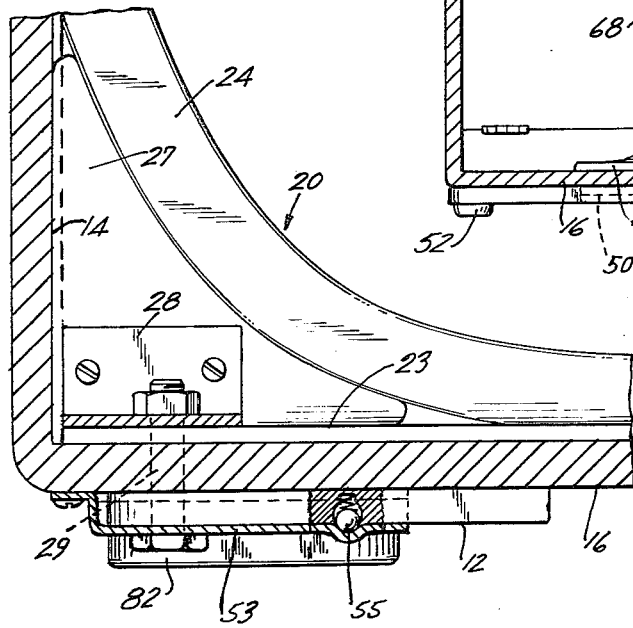
INVENTOR.
CHARLES R. WOOD
BY
Clark+Ott
ATTORNEYS

United States Patent Office 3,051,540
Patented Aug. 28, 1962

3,051,540
CARRYING CASE AND SEAT
Charles R. Wood, 45 Glenorchy Road,
New Rochelle, N.Y.
Filed Oct. 5, 1960, Ser. No. 60,680
6 Claims. (Cl. 312—235)

This invention relates to a carrying case and a seat adapted to be mounted on the case for supporting an individual in seated relation thereon. While not limited thereto, the invention is particularly adapted for use by artists, campers, fishermen and the like for containing equipment adapted for use by an individual when in seated position. The case provides a convenient means for carrying the seat which may be readily disposed in operative position thereon.

An object of the invention therefore is to provide an improved construction of carrying case and seat in which the seat may be readily disposed in operative position on the case and which forms a strong support therefor.

Another object of the invention is to provide means within the case for transmitting the load on the seat to the bottom wall of the case.

Another object of the invention is to provide a case of said character with means connected with the under side thereof providing a spread support for the case and the weight imposed upon the seat.

Still another object of the invention is to provide a collapsible seat consisting of a plurality of angularly disposed supports to which a flexible seat member is releasably connected and which supports are pivotally and slidably connected with a base adapted to be mounted on the case for movement from a collapsed position for applying the seat member thereto to an operative position for retaining the seat member in spread seat formation.

With the foregoing and other objects in view, reference is now made to the following specification and accompanying drawings in which the preferred embodiment of the invention is illustrated.

In the drawings:

FIG. 1 is a perspective view of a carrying case constructed in accordance with the invention for mounting a seat in supported relation thereon.

FIG. 2 is an enlarged end view showing the seat in position on the case and the case disposed in open set up relation.

FIG. 3 is a top plan view of the case and seat with the case shown in open relation.

FIG. 8 is an enlarged bottom plan view of the case.

FIG. 9 is an enlarged fragmentary sectional view taken approximately on line 9—9 of FIG. 8.

FIG. 10 is a sectional view similar to FIG. 4 but showing a modified form of frame structure within the case for supporting the seat.

Figure 5:
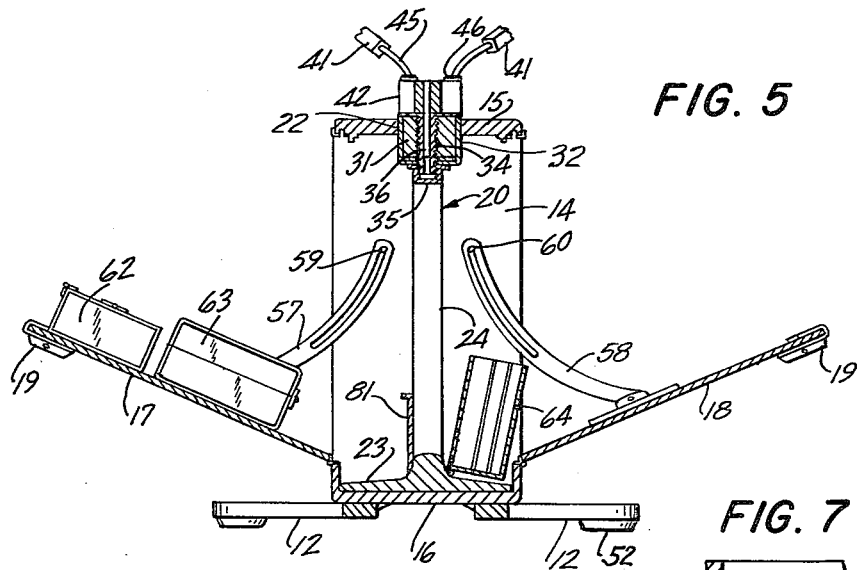
FIG. 5 is a transverse sectional view taken approximately on line 5—5 of FIG. 4.
Figure 7:
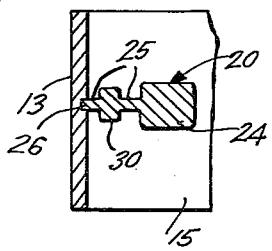
FIG. 7 is a fragmentary sectional view taken approximately on line 7—7 of FIG. 4.

Referring to the drawings, the carrying case 10 is constructed for mounting a seat 11 thereon for supporting an individual in seated relation and with spread supports 12 arranged below and connected with the case for stabilizing the case and for distributing the weight thereof over a relatively large area of a supporting surface.

The case 10 may be of any desired construction having end walls 13 and 14, top and bottom walls 15 and 16 and one or more hingedly connected panels forming side closures for gaining access to the case. In the embodiment illustrated two side closures 17 and 18 are provided which are located on opposite sides of the case and which are adapted to be secured in closed relation by latches 19.

A frame structure is arranged within the case to receive the downward thrust of the seat 11 and the weight of an individual seated thereon and for transmitting the same to the bottom wall 16 and to the spread supports 12 for use by artists and the like. The frame structure preferably consists of a peripheral frame 20 of general elliptical formation which is arranged in a plane extending medially between the closure panels 17 and 18 and has a large central opening 21 therein whereby a palette may be stored in the case alongside said frame with the central portion thereof located in registry with the opening 21 so that wet paint thereon will not be smeared. The frame structure 20 snugly fits between the end walls 13 and 14 of the case and protrudes through a rectangular opening 22 in the top wall 15 thereof and has a footing or a base 23 which overlies and is secured to the bottom wall 16 of the case.

Figure 4:
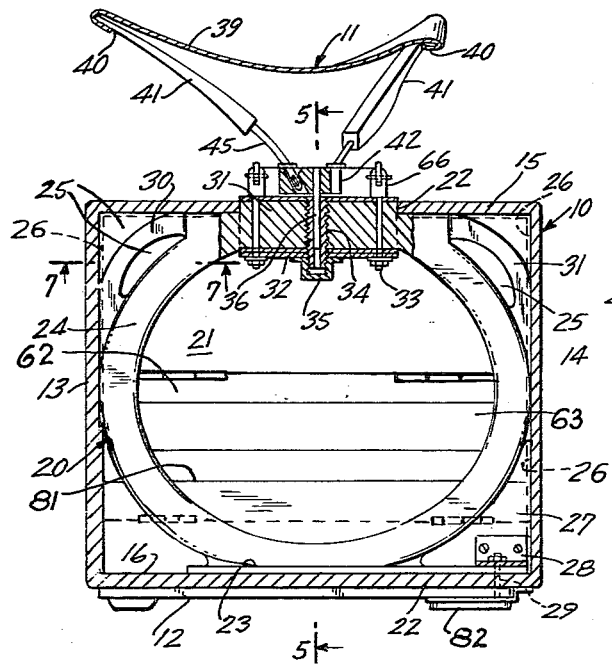
FIG. 4 is a vertical sectional view taken approximately on line 4—4 of FIG. 3.

The frame structure includes a peripheral portion 24 and web portions 25 at each side which extend outwardly in the plane of the frame and project into a groove 26 in the top and end walls of the case. The frame structure also includes a web portion 27 which extends outwardly in the plane of the frame and projects into the groove 26 in the end wall 14 and is connected with the base 23. Brackets 28 are secured by rivets or other means to the opposite sides of the web portion 27 and bolts 29 extend downwardly through the bottom flange thereof and through the base 23, bottom wall 16 and the outer ends of the supports 12 thereby securing the frame in position in the case and swingably connecting the supports 12 thereto. The web portion 27 is somewhat thicker than the web portions 25 while the latter web portions have widened arcuate extensions 30 as shown in FIGS. 4 and 9 to provide increased strength to the upper portion of the frame.

Surrounding the upper portion 31 of the frame is a metal band 32 which protrudes through the rectangular opening 22 in the top wall of the case with the lower ends of the band doubled over beneath the upper portion 31. Securing means such as bolts 33 extending vertically through the top and bottom portions of the band 32 and through the upper portion 31 of the frame secure the band in position thereon. A sleeve 34 extends downwardly through the band and the upper portion 31 substantially medially of the top wall of the case and which sleeve has a cap 35 threadedly secured to the lower end thereof with the upper end of the sleeve being open so as to provide a socket for slidably receiving the depending shank 36 of the seat 11.

The seat 11 includes a flexible seat member 39 consisting of a sheet of leather, canvas and the like which is of general triangular shape in plan and has sockets 40 in the under side thereof at the apexes for mounting the same on arms 41 emanating from a metal base 42 with adjacent arms 41 subtending approximately an angle of 120° and with the arms movable from outwardly and upwardly extending supporting relation on the base to a collapsed relation therewith for applying the seat member 39 thereto and for freeing the same therefrom. The base 42 is disposed in supported relation on the medial upper portion 31 of the frame with the shank 36 depending from the base and slidably fitting the sleeve 34 and with the lower end of the shank spaced from the cap 35.

Figure 6:
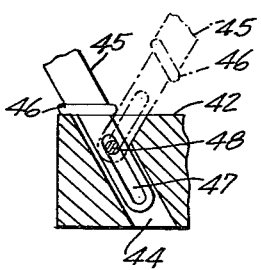
FIG. 6 is an enlarged fragmentary sectional view through a portion of the base of the seat and one of the seat supports.

The base 42 is formed with angularly disposed slots 44, three being shown in the present embodiment which extend outwardly through the upper face thereof at an angle of approximately 60° to the plane thereof and with adjacent slots disposed approximately 120° apart for receiving the inner ends 45 of the arms 41. The arms 41 are of arcuate formation and the inner ends 45 thereof consist of metal bars having shoulders 46 and slots 47 adjacent the inner ends thereof. The shoulders 46 are adapted to seat upon the base 42 for transmitting the load thereto and cross pins 48 are anchored in the base and extend through the slots 47 respectively. The said pins extend through the upper portions of the slots 47 when the seat is in the operative position on the case and when the seat is to be collapsed, the arms 41 may be moved outwardly so as to dispose the said pins at the inner ends of the slots 47 whereby the arms may be swung inwardly as shown in broken lines in FIG. 6 of the drawings for freeing the seat member 39 from the arms. For this purpose the slots 44 extend radially inward at their upper ends to permit of inward swinging movement of the arms as shown in FIG. 6 of the drawings.

The supports 12 are of angulated formation in plan and extend longitudinally below the case between the plates 50 when the case is not in use as a support for the seat 11. The supports are movable to spread relation against the angulated edges 51 of the plates 50 as shown in FIGS. 2, 5 and 8 of the drawings. It will be understood that the outer ends of the supports 12 are disposed at the forward end of the case so as to stabilize the forward end when an individual is seated on the seat 11 with his feet located forwardly of the supports 12. The supports are preferably provided with cushions 52 at the forward ends thereof which may be suction cups and the like and a metal plate 53 is affixed to the under side of the bottom wall 16 and extends in underlying relation with the pivoted ends of the supports. A detent means 55 is provided for each of the supports 12 disposed between the same and the plate 53 for releasably retaining the support in inward position beneath the case.

The closure panels 17 and 18 have straps 57 and 58 pivotally connected thereto respectively and which straps have pin and slot connections 59 and 60 with the end wall 14 of the case for limiting the downward swinging movement thereof. For use by artists and the like the closure panel 17 is preferably provided with containers 62 and 63 for receiving tubes of paint, brushes and the like and a receptacle 64 is pivotally mounted within the case for swinging movement from angular relation to parallel relation with the frame 20 and this receptacle has partition walls providing compartments for receiving palette, palette and panel holders and spare panels in stored relation therein.

The bolts 33 have heads 66 at the upper ends thereof to which a handle member 67 is pivotally connected for use in carrying the case.

It will be understood that the frame 20 supports the seat 11 and the loaded thereon and transmits the same to the bottom wall of the case and the supports 12 whereby the top wall and the side and end walls of the case are free of the load on the seat. For this purpose the frame 20 is not affixed to the top and end walls of the case but is held firmly in position by the interfitting construction of the webs 25 in the grooves 26 and by the upper portion 31 of the frame snugly protruding through the opening 22 in the top wall of the case.

The seat 11 may be rotated or moved from said to side with reference to the case 10 since the depending shank 36 pivotally fits the sleeve 34. This permits of the convenient removal of the seat together with the base 42 and arms 41 thereof which may be collapsed and stored in the case in the space below the container 63 and alongside of a partition wall 81.

Instead of the peripheral frame 20, the case may be provided with a frame structure 68 as shown in FIG. 10 of the drawings on which the seat 11 is adapted to be mounted. The frame structure 68 includes an upright frame member 69 having a base 71 and an enlarged upper end 72 protruding through a rectangular shaped opening 73 in the top wall 15 of the case. A metal band 74 extends over the opposite sides and the top of the upper end 72 with the lower ends of the band doubled over under the ends thereof and secured in doubled over relation by bolts 75 similar to the bolts 33 in the previous form. A sleeve 76 extends downwardly through the upper end 72 providing a socket for slidably receiving the depending shank 36 of the seat 11. The frame structure also includes an angularly extending frame member 77 which is affixed at its lower end to the base 71. Brackets 78 are affixed to the opposite sides of the frame member 77 and bolts 79 extend downwardly through the bottom flanges of the brackets and through the bottom wall 16 of the case and the supports 12 to thereby secure the frame structure in position in the case and pivotally connecting the supports 12 with the case. The frame structure 68 is disposed substantially medially between the side walls of the case and functions to support the seat 11 and the load thereon similar to the frame structure 20 in the previous form. The frame member 69 of said frame structure is of cruciform configuration in cross-section whereby the same rigidly supports an individual in seated position on the seat without distorting the walls of the case.

The plate 53 is adapted to engage a supporting surface at one end of the case while the cushions 52 at the forward end of the supports 12 contact the supporting surface at the forward end thereof. For this purpose the plate 53 is provided with depending cushions 82 which are disposed on a horizontal level with the cushions 52.

While the preferred forms of the invention have been shown and described herein, it is to be understood that the invention is not so limited but shall cover and include any and all modifications thereof which fall within the purview of the invention.

What is claimed is:

1. In a carrying case and seat combination, an elongated case including end and side walls and top and bottom walls, said top wall having an opening therethrough, at least one of said side walls including a hingedly connected closure for gaining access to the case, a frame located within the case and extending between the top and bottom walls thereof and with an upper portion thereof projecting into said opening in the top wall of the case to gain slight lateral support from said case, a seat for supporting an individual in seated position thereon, means pivotally mounting said seat on the projecting upper portion of said frame with the seat arranged in spaced relation above said case whereby a weight imposed upon said seat is transmitted to said frame and by said frame to the bottom wall of the case, and bars extending longitudinally of said case below the bottom wall thereof and pivotally connected therewith for swinging movement of said bars from longitudinally extending relation with said case to divergent relation extending outwardly therefrom.

2. In a carrying case and seat combination, an elongated case including side walls and top and bottom walls, said top wall having an opening therethrough, at least one of said side walls including a hingedly connected closure for gaining access to the case, a frame located in substantially equally spaced relation from opposite side walls of said case and extending peripherally therein with an upper portion projecting into said opening in the top wall of the case to gain lateral support therefrom, and a bottom portion in contact with said bottom wall, a seat for supporting an individual in seated position thereon, means pivotally mounting said seat on the projecting upper portion of said frame with the seat arranged in spaced relation above said case whereby weight imposed upon said seat is transmitted through the frame to said bottom wall, and bars extending longitudinally of said case below the bottom wall thereof and pivotally connected therewith adjacent one end of said case for swinging movement of said bars from longitudinally extending relation with said case to divergent relation extending outwardly from said case.

3. In a carrying case and seat combination, an elongated case including side walls and top and bottom walls, at least one of said side walls including a hingedly connected closure for gaining access to the case, a frame located in substantially equally spaced relation from opposite side walls of the case and extending peripherally therein with an upper portion projecting into an opening extending through the top wall of the case and a bottom portion in contact with said bottom wall, a seat for supporting an individual in seated position thereon, a base connected with said seat and disposed in bearing relation on the projecting upper portion of said frame with the seat arranged in spaced relation above said case whereby weight imposed upon the seat is transmitted to said frame and bottom wall, means pivotally mounting said base on said projecting upper portion, and bars extending longitudinally of said case below the bottom wall thereof and pivotally connected therewith adjacent one end of said case for swinging movement of said bars from longitudinally extending relation with said case to divergent relation extending outwardly therefrom.

4. In a carrying case and seat combination, an elongated case including end and side walls and top and bottom walls, said top wall having a substantially medial opening extending therethrough, at least one of said side walls including a hingedly connected closure for gaining access to the case, an elliptical shaped frame extending lengthwise of the case in substantially equally spaced relation from opposite side walls thereof and supported on the bottom wall and having a central upper portion projecting into said opening in the top wall of the case to gain lateral support therefrom, a seat for supporting an individual in seated position thereon, a base for said seat disposed in bearing relation on the projecting upper portion of said frame, a plurality of arms swingably connected with said base for movement from collapsed upwardly extending relation to divergent outwardly extending relation for supporting said seat in position thereon and for freeing the same therefrom when said arms are in said upwardly extending relation, and bars extending longitudinally of said case below the bottom wall thereof and pivotally connected therewith adjacent one end of said case for swinging movement of said bars from longitudinally extending relation with said case to divergent relation extending outwardly therefrom.

5. In a carrying case and seat combination an elongated case including end and side walls and top and bottom walls, said top wall having a substantially medial opening extending therethrough, at least one of said side walls including a hingedly connected closure for gaining access to the case, an elliptical shaped frame extending lengthwise peripherally within the case and in substantially equally spaced relation from opposite side walls thereof and having a lower portion in contact with the bottom wall and a central upper portion projecting into said opening in the top wall of the case to gain lateral support from the case, a flexible seat for supporting an individual in seated position thereon, said seat having a plurality of spaced pockets in the under side thereof, a base for said seat disposed in bearing relation on the projecting upper portion of said frame, a plurality of arms swingably connected with said base for movement from collapsed upwardly extending relation to divergent relation extending outwardly into the pockets respectively of said seat for supporting said seat in position thereon and for freeing the same therefrom when said arms are in said upwardly extending relation, and bars extending longitudinally of said case below the bottom wall thereof and pivotally connected therewith adjacent one end of said case for swinging movement of said bars from longitudinally extending relation with said case to divergent relation extending outwardly therefrom.

6. In a carrying case and seat combination, a case including side, end and top and bottom walls, said top wall having an opening extending therethrough, one of said side walls including a closure for gaining access to the case, an elliptical shaped frame located within the case in substantially equally spaced relation from opposite side walls and disposed against the inner faces of the top, bottom and end walls thereof, said frame having an upper portion projecting into said opening in the top wall to gain lateral support from the case, a seat for supporting an individual in seated position thereon, and a base connected with said seat and releasably secured in bearing relation on the projecting upper portion of said frame for transmitting the load on said seat to said frame and bottom wall to eliminate substantial stress on the top and side walls of the case.

References Cited in the file of this patent

UNITED STATES PATENTS

| | | |
|---|---|---|
| D. 147,788 | Gormley | Nov. 4, 1947 |
| 616,296 | Dennis | Dec. 20, 1898 |
| 1,472,570 | Snider | Oct. 30, 1923 |
| 2,104,072 | Carr | Jan. 4, 1938 |
| 2,137,799 | Brandenburg | Nov. 22, 1938 |
| 2,576,287 | English | Nov. 27, 1951 |

FOREIGN PATENTS

| | | |
|---|---|---|
| 161 | Great Britain | of 1855 |